(12) United States Patent
Gao et al.

(10) Patent No.: US 8,768,915 B2
(45) Date of Patent: Jul. 1, 2014

(54) DATABASE SYSTEM AND METHOD OF OPTIMIZING CROSS DATABASE QUERY

(75) Inventors: Bo Gao, Beijing (CN); Chang Jie Guo, Beijing (CN); Zhong Bo Jiang, Beijing (CN); Wei Sun, Beijing (CN); Kai Tang, Beijing (CN); Feng Juan Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 915 days.

(21) Appl. No.: 12/916,412

(22) Filed: Oct. 29, 2010

(65) Prior Publication Data
US 2011/0106789 A1    May 5, 2011

(30) Foreign Application Priority Data
Oct. 30, 2009    (CN) .......................... 2009 1 0209075

(51) Int. Cl.
*G06F 17/30*    (2006.01)

(52) U.S. Cl.
USPC ........... 707/718; 707/713; 707/790; 707/899; 706/12; 706/14; 709/201; 709/238

(58) Field of Classification Search
None
See application file for complete search history.

(56) References Cited

U.S. PATENT DOCUMENTS

| | | | |
|---|---|---|---|
| 7,523,118 B2* | 4/2009 | Friedlander et al. ................... | 1/1 |
| 7,610,264 B2* | 10/2009 | Ewen et al. ............................ | 1/1 |
| 8,250,583 B2* | 8/2012 | Grasselt et al. ............... | 718/106 |
| 2003/0154236 A1* | 8/2003 | Dar et al. ....................... | 709/201 |
| 2007/0276851 A1* | 11/2007 | Friedlander et al. .......... | 707/101 |
| 2008/0189243 A1* | 8/2008 | Li et al. .............................. | 707/2 |
| 2009/0037391 A1* | 2/2009 | Agrawal et al. .................... | 707/3 |
| 2009/0063524 A1* | 3/2009 | Adler et al. .................... | 707/101 |
| 2009/0234799 A1* | 9/2009 | Betawadkar-Norwood et al. ................................. | 707/2 |

FOREIGN PATENT DOCUMENTS

| | | | | |
|---|---|---|---|---|
| CN | 101169785 A | 4/2008 | ............. | G06F 17/30 |
| CN | 101404013 A | 4/2009 | ............. | G06F 17/30 |

OTHER PUBLICATIONS

X J Xiao, Research on Query&Optimization Mechanism of Database Middleware, globethesis.com GTID:2168360152987092 (Dec. 31, 2005) (English Abstract).
Office Action dated Jun. 13, 2012 for priority Chinese Patent Application No. 200910209075.X.

* cited by examiner

*Primary Examiner* — Hung Le
(74) *Attorney, Agent, or Firm* — Ido Tuchman; Gail H. Zarick

(57) ABSTRACT

A database system and a method of optimizing cross-database query. The database system includes a plurality of databases. At least two of the databases are stored with one or more data collections composed of tables with the same structure. A federated view of the data collection is created on each of the databases. A request routing layer for routing, in response to a query request crossing the data collections, the query request crossing the data collections to one of the at least two databases according to a predetermined routing rule, so as to query by using the federated view of the database.

16 Claims, 11 Drawing Sheets dbA.SalesOrder:

| ID | Tenant | Name | Num | Price |
|---|---|---|---|---|
| 001 | T1 | TV set | 10 | 1000 |
| 002 | T1 | Desk | 100 | 100 |
| 003 | T2 | TV set | 50 | 900 | dbB.SalesOrder:

| ID | Tenant | Name | Num | Price |
|---|---|---|---|---|
| 001 | T3 | TV set | 10 | 1000 |
| 002 | T3 | Cookie | 600 | 10 |
| 003 | T4 | Car | 5 | 15000 |

Fig.3

DATABASE SYSTEM AND METHOD OF OPTIMIZING CROSS DATABASE QUERY

CROSS-REFERENCE TO RELATED APPLICATIONS

This application claims priority under 35 U.S.C. §119 to Chinese Patent Application No. 200910209075.X filed Oct. 30, 2009, the entire text of which is specifically incorporated by reference herein.

BACKGROUND

The present invention generally relates to database field, and in particular, to a database system and a method of optimizing cross-database query.

At present, in database field, if a query to be performed involves data tables with the same structure stored in a plurality of databases, two methods, for example, can be generally used. As one of the methods, query can be performed on each of the plurality of databases, and then the results of the query obtained from respective databases are aggregated together in application logic, followed by providing it to the query requester. However, this method involves complicated programming logics, and has low query performance.

As the other of the methods, a part of data in other databases of the plurality of databases can be synchronized periodically or in real-time in one database as a query object, and only this database will be used to response the cross-database queries. However, a problem of data redundancy may occur in this method, especially when a great deal of data needs to be synchronized, in which a target database is required to have considerable capacity. Additionally, it is hard to maintain data consistency in such a method as synchronizing data in a plurality of databases into one database. Furthermore, a complex synchronization mechanism or logic is required to implement synchronizing, and real-time support may be needed, all of which increase complexity of the system.

The above problems are especially serious in a SaaS environment. SaaS is the abbreviation of Software-as-a-Service, which is one mode of providing software through Internet. Using the mode, a user need not purchase a software product, but turns to rent the Web-based software from a service provider, to manage enterprise's business without maintaining the software. The user who rents software is called a "tenant". The service provider will provide full management and maintenance for software, and also provide off-line operation and local data storage of software while providing internet application for the tenant, so that the tenant can use his rented software and service anywhere and at any time. For many small-size enterprises, Saas is the best way to use advanced techniques, which eliminates the need of purchasing, deploying and maintenance of infrastructure and applications for enterprises.

A large-size SaaS application may have lots of tenants and data, and generally uses a scaling out mechanism as the business increases. The so-called scaling out is to divide the data of the application, and to distribute data that should have been collectively stored onto different physical databases according to a certain rule.

FIG. 1 shows an exemplary SaaS database system using a scale out mechanism. In this SaaS database system, three underlying databases are used, and data is divided into the three underlying databases based on tenants. Hereinafter, a collection of data belonging to a tenant is referred to as "tenant data" of this tenant. In the SaaS database system shown in FIG. 1, tenant data of tenants T1, T2 and T5 are located in a database A, tenant data of tenants T3 and T4 are located in a database B, and tenant data of tenant T6 are located in a database C.

There are cross-tenant data access requirements in many typical SaaS applications at present. FIG. 2 shows several example cases requiring cross-tenant access. For example, in a case when both retailer and suppliers are tenants of the same SaaS application, the retailer may hope to see all or part of data of its suppliers when authorized by the suppliers. For example, a parent company may hope to see data of its subsidiary, and the subsidiary may hope to see data of its branches. In addition, a SaaS service provider such as an operator may need to access all tenants' data for some reasons so as to generate report or perform operations or the like.

In order to satisfy the above requirements, processing is generally performed as follows in the related art. For example, in the case of FIG. 1, it supposes that order tables SalesOrder as shown in FIG. 3 exist in the databases A and B, respectively. In the table SalesOrder shown in FIG. 3 as a simple example, each of the columns represents the following meanings, respectively. ID is identification for identifying a row, Tenant refers to the tenant to which data in the row belong, Name refers to name of goods involved in an order, Num refers to the number of goods involved in an order, and Price refers to price of goods involved in an order.

For example, if the tenant T1 wants to query data of all its orders as well as data of an order in which the number of goods involved in the order of tenant T3 in another database B is greater than 500, the tenant T1 operates on a Web-based software, and the Web-based software generates a SQL query statement as follows:

```
SELECT * FROM SalesOrder WHERE Tenant= 'T1' OR
    (Tenant= 'T3' AND Num>500);
```

The SQL statement is transmitted to a request routing layer in FIG. 1 by the Web-based software, and the request routing layer transmits the above statement to respective databases A, B and C. The SQL statement is respectively performed in the databases A, B and C. For example, two rows of data with IDs 001 and 002 in dbA.SalesOrder are obtained by performing the SQL statement in the database A, one row of data with ID 002 in dbB.SalesOrder is obtained by performing the SQL statement in the database B, and a null set is obtained by performing the SQL statement in the database C. The result sets are respectively sent back to the request routing layer after each of the databases performs the above query. Then, the request routing layer aggregates the result set of the query returned from the databases A and B, and a final query result is obtained by getting a union set of these sets in the present example. Finally, the request routing layer returns the query result to the Web-based software to display the final result to the tenant T1. However, as described above, this method involves complicated programming logics, and needs each database to perform query, so the query performance is low.

Moreover, functions such as AVG or the like cannot be used in SQL query statement by using the related art. This is because, in each database, an average can be calculated for the data stored in the database by using the functions such as AVG or the like, and data stored in another database cannot be accounted. For example, in the case of FIG. 3, if it is desired to obtain average price of orders of both tenants T1 and T3, SQL statement is generated as follows: SELECT AVG (Price) FROM SalesOrder WHERE Tenant='T1' OR Tenant='T3'. An average price of the order of the tenant T1 and an average price of the order of the tenant T3 are returned by respectively performing the statement in the databases A and B, but an average price of orders of both tenants T1 and T3 cannot be obtained. Thus, functions such as AVG cannot be used in this case. Herein, function AVG is just an example of functions, which can also include, but not be limited to, COUNT, MAX, MIN, SUM and self-defined functions and so on.

In recent years, a technique called as federated database has been developed. LAN, computer and mainframe existing as independent systems comprised in department or division, of many organizations, has respective databases. When an enterprise computing platform is built to interconnect an organization, heterogeneous database systems distributed in the organization should be combined into a federated database so as to provide access to data for multiple users. A software layer is provided by using a middle-ware or an environment such as distributed computer environment (DCE), through which a user can interoperate with various systems. Using the federated database technique, one SQL statement can be used to query data in a plurality of data sources. These data sources can be various, which can be either relational database or non-relational database, e.g., Excel of Microsoft, xml, etc.

Federated view is a view in the federated database, and its basic table is in remote data sources. The basic table is quoted in accordance with nickname instead of table name of data source in the federated view. Data are retrieved from the remote data sources when being queried from the federated view.

The federated database and the federated view technique can be applied to the SaaS environment. For example, a federated view (FV) can be built in an underlying database A in the SaaS database system to which the federated database technique is applied, which is a view federating tables with the same structure contained in a plurality of underlying databases. A requester can be provided with transparent cross-database query service by performing query using the federated view via the database in which the federated view is built.

In addition, there still exists a problem in the existing SaaS database system. Since the number of tenants are increasing, a service provider accommodates new tenants through scaling out (by increasing new databases) when a database cannot accommodate more tenant data of tenants. Generally, the load of a database accommodating more tenants is relatively heavy, while the load of a database accommodating fewer tenants is relatively light. Thus, a mechanism is further needed to balance loads of respective databases in a database system.

BRIEF SUMMARY

In order to solve the above problems, an example embodiment of the present invention is in a database system including a plurality of databases, provide a database system capable of optimizing, cross-database query by creating a federated view on each database, and a method of optimizing cross-database query.

According to example one aspect of the present invention, a database system is provided, which includes a plurality of databases, with at least two of the plurality of databases stored with one or more data collections composed of tables with the same structure. A federated view of the data collection is created on each of the at least two databases. A request routing layer for routing, in response to a query request crossing the data collections, the query request crossing the data collections to one of the two databases according to a predetermined routing rule, so as to query by using the federated view of the database.

Another example aspect of the present invention is a method of optimizing cross-database query in a database system. The database system includes a plurality of databases. At least two of the databases are stored with one or more data collections composed of tables with the same structure. The method includes a federated view creating step for creating a federated view of the data collections on each of the at least two databases. A routing step includes routing, in response to a query request crossing the data collections, the query request crossing the data collections to one of the at least two databases according to a predetermined routing rule so as to query by using the federated view of the database.

The database system and the method of optimizing cross-database query of the present invention can reduce the complexity of programming logic, reduce the data traffic when cross-database query is performed, and balance the query request intensity among databases, and thereby can increase query speed and efficiency. In addition, the database system and the method of optimizing cross-database query of the present invention can further use a function in a SQL statement of cross-database query.

BRIEF DESCRIPTION OF THE SEVERAL VIEWS OF THE DRAWINGS

The figures form a part of the specification and are used to describe the embodiments of the invention and explain the principle of the invention together with the literal statement.

FIG. 3 shows examples of tables stored in a database;

DETAILED DESCRIPTION

Hereinafter, embodiments of the present invention will be explained in detail with reference to the drawings.

Hereinafter, a SaaS database system is explained as an example, but the present invention is not limited thereto. Those skilled in the art will understand that the present invention can also be applicable in the case that a cross-database query is performed in any other database system having a plurality of databases, part or all of which have tables with the same structure. In addition, the term "data collection" refers to a collection of tables or a collection of other data structures in a database. The term "remote database" refers to a database located in a different hardware server. The term "remote table" refers to a table in a remote database.

Figure 4:
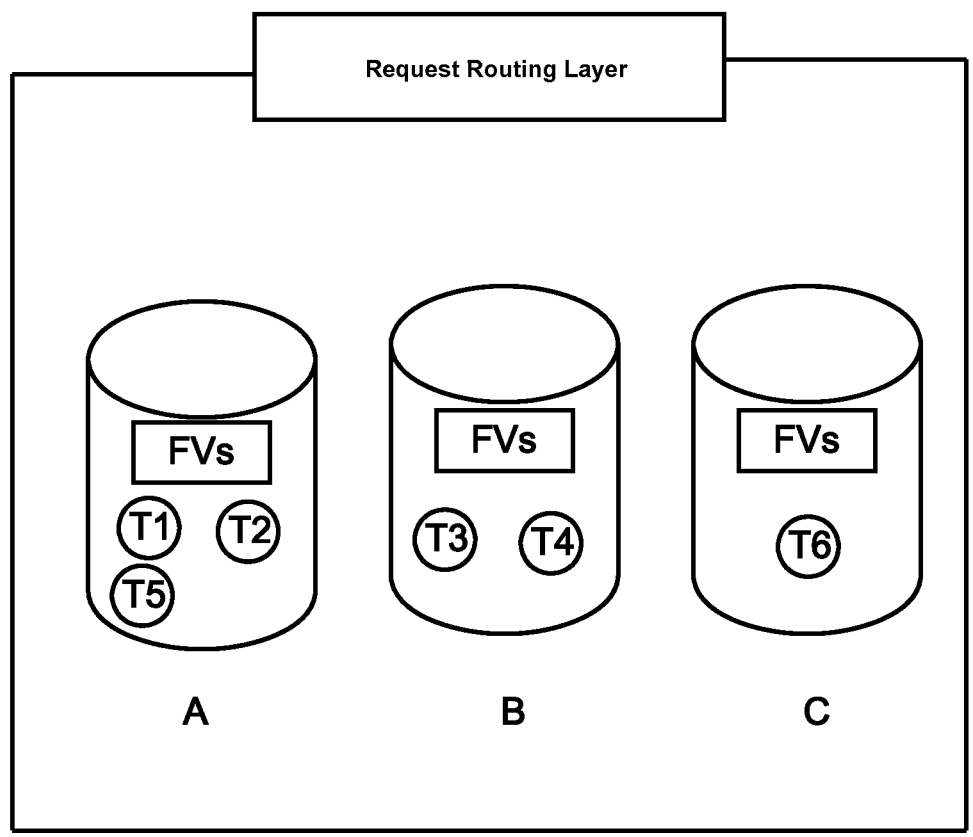
FIG. 4 is a schematic view showing a SaaS database system according to the first embodiment of the present invention.

FIG. 4 is a schematic view showing a SaaS database system according to a first embodiment of the present invention. In FIG. 4, federated views are built on databases A, B and C in an off-line state. Although three underlying databases are shown, it is only an example. The number of the underlying databases is not limited to three in other SaaS database system, since the SaaS database system is scalable. Two or all of the databases A, B and C can be located in a same server, and the databases A, B and C can also be distributed databases connected, for example, through LAN or internet. It supposes that the databases A, B and C are distributed databases for convenience of explanation in the present invention.

Herein, it supposes that tenants T1 to T6 are tenants renting a same SaaS application, and tables with the same structure are contained in tenant data thereof. Of course, the tenants T1 to T6 can also be tenants that rent different SaaS applications of a same SaaS service provider. For example, the tenants T1 to T5 rent application X, and the tenant T6 rents application Y. In this case, the tenants T1 to T5 and the tenant T6 may contain tenant data with different structures of tables, thus federated views are built for tables with a same structure only on the databases storing tenant data containing the tables with the same structure. In addition, in practice, even if the tenants T1 to T6 are tenants renting a same SaaS application, the number and structures of tables contained in their tenant data may not be completely the same. However, in consideration that tenants T1 to T6 are tenants renting the same SaaS application, the structures of most tables contained in their tenant data are the same. Thus, federated views are built for most tables with the same structure, which can also implement the purpose of the present invention.

Hereinafter, how to build a federated view on each of the databases is described with reference to FIG. 5 by taking the case of FIG. 4 as an example.

Figure 5:
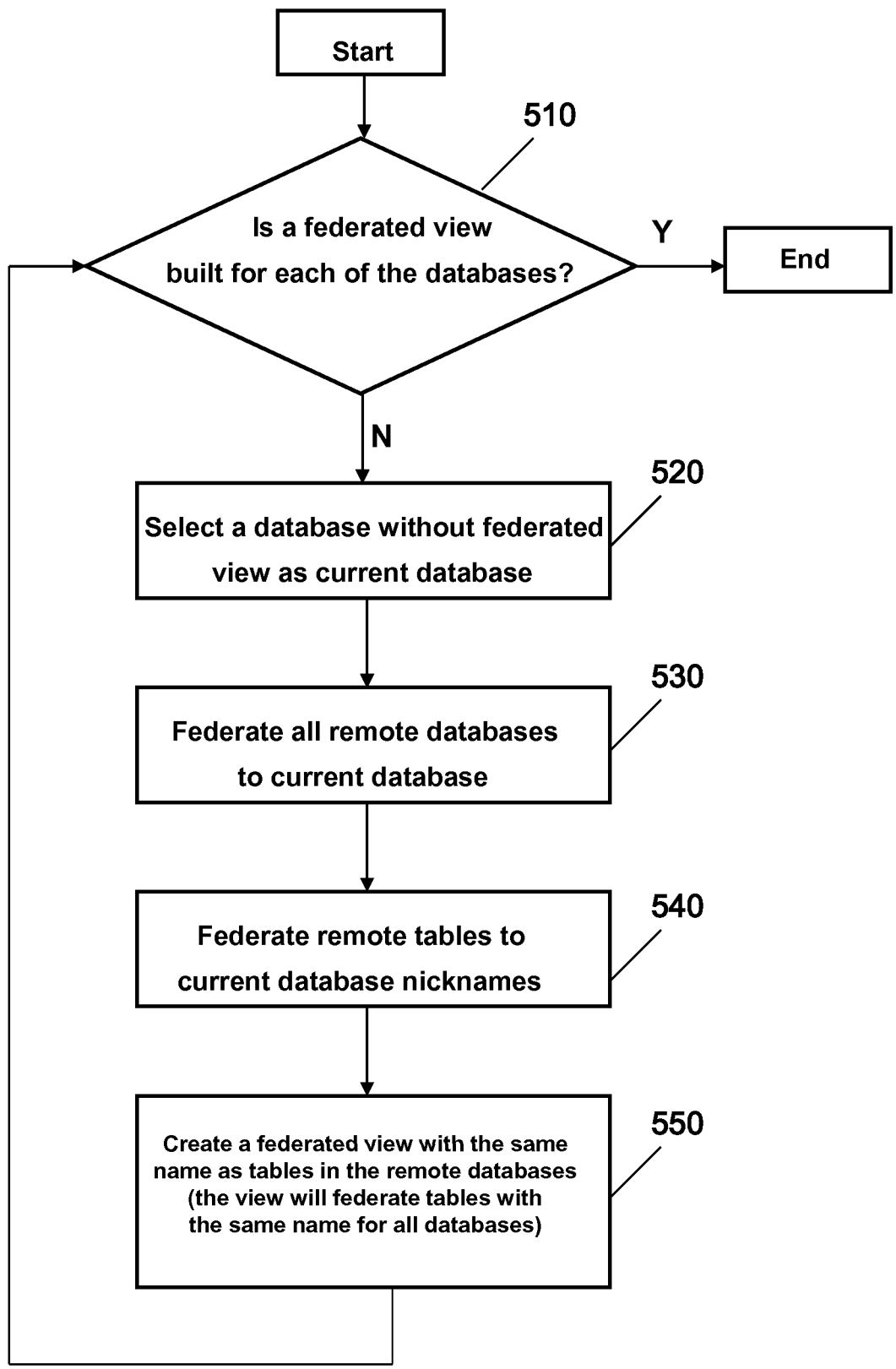
FIG. 5 shows a flowchart of process for building a federated view on each database in the SaaS database system according to the embodiment of the present invention.

FIG. 5 shows a flowchart of process for building a federated view on each of the databases in the SaaS database system according to the embodiment of the present invention. Firstly, it is determined whether a federated view is built for each of databases in the SaaS database system in step 510. When the determined result in the step 510 is Yes, the process ends. When the determined result in the step 510 is No, the process goes to step 520. In the step 520, a database on which a federated view has not been built yet is selected as current database for performing operations. All the remote databases are then federated to the current database in step 530. Then, in step 540, a nickname is created in the current database for the remote tables in the remote databases.

DB2 Database of IBM Corporation is hereinafter taken as an example, and the operations of the steps 530 and 540 are explained through the following code segment, for the case of three databases dbA, dbB and dbC.

```
CONNECT TO dbA;
CREATE WRAPPER DRDA LIBRARY 'libdb2drda.so';
CREATE SERVER dbB TYPE DB2/UDB VERSION '9.5' WRAPPER
"DRDA" OPTIONS (ADD DBNAME 'dbB');
    CREATE NICKNAME sfa.SalesOrder_d2 FOR dbB.SalesOrder;
    /* creating a nickname sfa.SalesOrder_d2 for the table
SalesOrder in the database dbB */
    CREATE SERVER dbC TYPE DB2/UDB VERSION '9.5' WRAPPER
"DRDA" OPTIONS (ADD DBNAME 'dbC');
    CREATE NICKNAME sfa.SalesOrder_d3 FOR dbC.SalesOrder;
```

-continued

```
    /* creating a nickname sfa.SalesOrder_d3 for the table
SalesOrder in the database dbC */
```

By performing the above code segment, remote databases dbB and dbC are federated in the database dbA, and nicknames are respectively created in the database dbA for the remote tables SalesOrder in the remote databases dbB and dbC.

Then, a federated view is created using the same name as that of the table in the remote databases in step 550, which will federate tables with the same name from all databases. The creating of the federated view on the database dbA is achieved by the following code segment.

```
        CREATE VIEW SalesOrder AS
        SELECT * FROM sfa.SalesOrder_d2
        /*select data of the table SalesOrder in the database
        dbB */
        UNION ALL
        SELECT * FROM sfa.SalesOrder_d3
        /* select data of the table SalesOrder in the database
        dbC */
        UNION ALL
        SELECT * FROM SalesOrder;
        /* select data of the table SalesOrder in the database
        dbA */
```

The process returns to the step 510 after the operation in step 550 is completed, so as to create a federated view for each of other databases. The manner of creating federated views on the databases dbB and dbC is similar to the above manner, and the description thereof is not repeated herein. When federated views are created on all the three databases, the process in FIG. 5 ends. It should be noted that the above example only federates a table SalesOrder in each database for convenience of explanation. However, all tables with the same structures in each database are required to be federated in practice.

Referring back to FIG. 4, the schematic view in FIG. 4 includes a request routing layer which routes cross-tenant query requests to one of the databases A, B and C according to a predetermined routing rule at runtime so as to query by using the federated view in the database. The request routing layer is provided by, e.g., middle-ware product or distributed computer environment (DCE), and can be realized as a separate machine, or can be realized as a part of application logic by JDBC Wrapper/Driver, to route a SQL query from a tenant to a corresponding underlying database.

Figure 1:
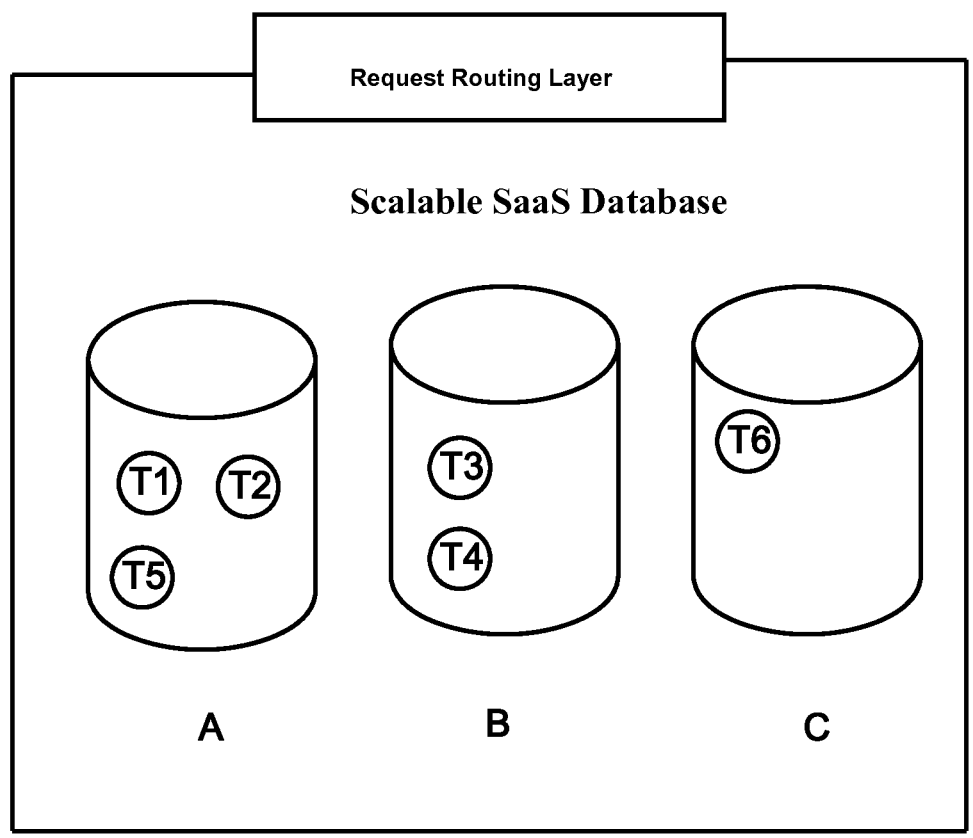
FIG. 1 shows an exemplary SaaS database system using the scaling out mechanism.
Figure 2:
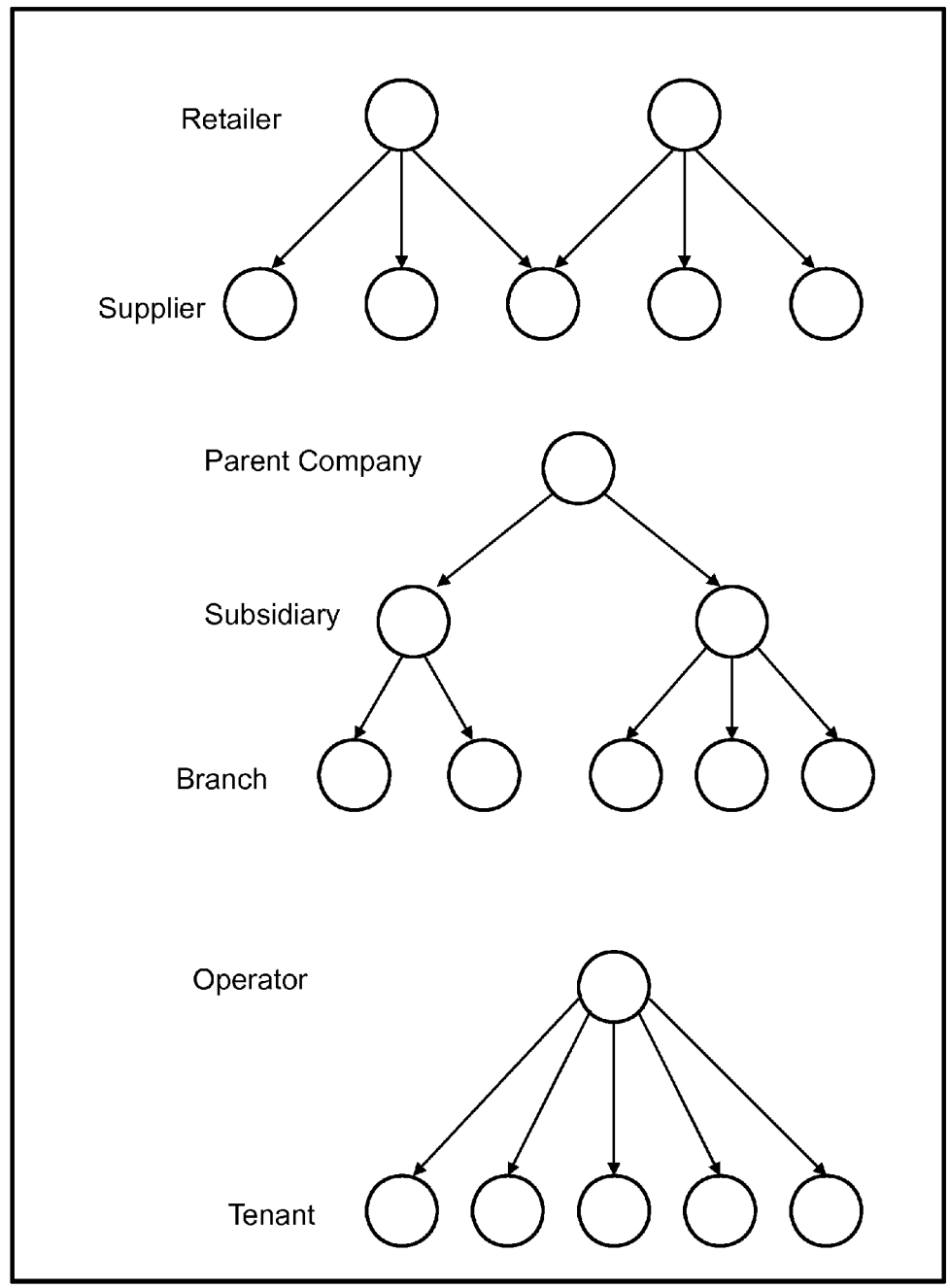
FIG. 2 shows several example cases requiring cross-tenant access.

As for a normal query request relating to only one tenant data, the request routing layer (FIG. 4) of the present invention functions the same as that in the related art of FIG. 1, i.e. for routing a query quest from a tenant to an underlying database in which tenant data involved in an SQL query of the tenant is located, according to the SQL query. However, as for a query request relating to a plurality of tenant data, the request routing layer in FIG. 1 must send the query request to each of the underlying databases. Whereas, federated views are created in all of the databases A, B and C in FIG. 4 by the process shown in FIG. 5 according to the present invention, so that the request routing layer of the present invention has a capability of routing cross-tenant query request to any individual database.

According to the embodiment of the present invention, for a SQL query statement including such a function as AVG, for example, SELECT AVG (Price) FROM SalesOrder WHERE Tenant='T1' OR Tenant='T3', the query statement can be routed to any single underlying database to be performed, since a federated view is created on each database. The request routing layer can route a cross-tenant query request based on the following predetermined routing rules:

1) Routing a cross-tenant query request from a tenant to a database where the tenant data of the tenant is located; and 2) Routing a cross-tenant query request from a tenant to a database where most tenant data involved are located.

The above routing rules can be used in the SaaS database system according to the embodiment of the present invention. While in the case of FIG. 1, there are not federated views built on the databases A, B and C, thus a query request cannot be routed to a single database to process a cross-tenant query request.

Routing Rule 1

Since the data required for satisfying a cross-tenant query request of one tenant generally include the data in the tenant data of the tenant itself, the data traffic between databases can be reduced by routing using Routing Rule 1. When the tenant data involved in a cross-tenant query request are located in one database, data transmission between databases can even be avoided. For example, data transmission is avoided by routing a request T3 (T3, T4) to the database B. Herein, the request T3 (T3, T4) schematically represents a query request from the tenant T3 that involves the tenants T3 and T4.

Routing Rule 2

With regard to a request T3 (T1, T2, T3), the request will be routed to the database B if Routing Rule 1 is adopted. However, T1 and T2 are located in the database A, data transmission can still be generated between the databases A and B if the query is performed using the database B. In this case, data traffic between databases can be further reduced by using Routing Rule 2. In particular, the sizes a, b and c of T1, T2 and T3 can be obtained from the underlying database by using database command or other mechanism, which, for example, may be the number of records in the tables involved in the current query, in T1, T2 and T3. Then, the data amount (a+b) involved in the database A and the data amount c involved in the database B are compared. If the former is relatively larger, the request T3 (T1, T2, T3) is routed to the database A; and if the latter is relatively larger, the request T3 (T1, T2, T3) is routed to the database B. The cross-tenant query request can be routed to the database that has most of data required for satisfying the request by using Routing Rule 2, thereby reducing data traffic between databases.

The forgoing only illustrates several possible routing rules for routing a cross-tenant query request, and does not intend to enumerate all of the routing rules. Those skilled in the art can understand that many known methods can be applied to SQL routing. The purpose of the above Routing Rules 1 and 2 is to reduce data transmission between databases as much as possible. However, in consideration of load balance, we can also adopt Routing Rule 3: routing a cross-tenant query request to a database with the lowest load based on the statuses of the underlying databases.

Routing Rule 3

For the application of Routing Rule 3, the following case may be considered, for example. When the database (database A) where tenant data of the requesting tenant (such as tenant T1) are located is in a high load status or has a slow responding speed (e.g., lower than a threshold), Routing Rule 3 can be used. A cross-tenant request such as T1 (T1, T2) from the tenant T1 is routed to one of the databases B and C that has the lower load. Herein, the status of the underlying database refers to load, response speed and the like of each underlying database in the SaaS system. The load refers to CPU utilization, memory utilization or the like of a server where each database is located, which can be obtained by known methods such as calling a system function or the like. The response speed refers to the time required for returning a query result. The time can be obtained by timing in the request routing layer.

Figure 6:
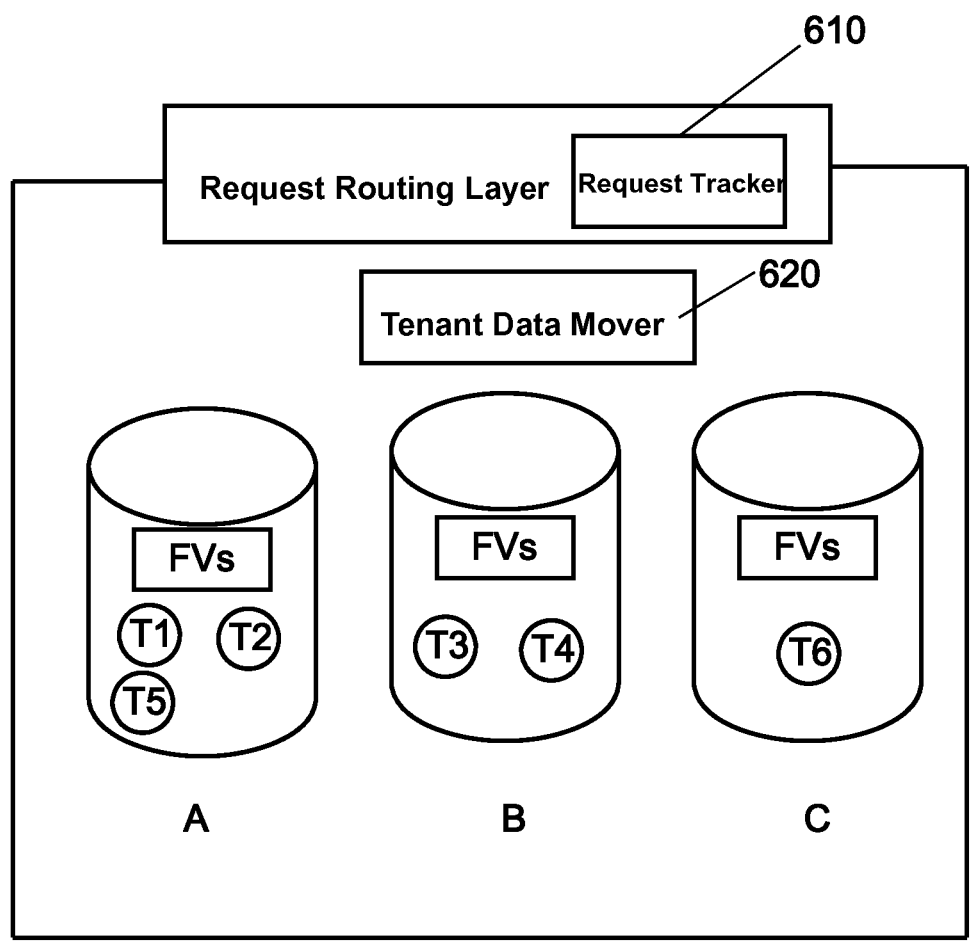
FIG. 6 is a schematic view showing a SaaS database system according to the second embodiment of the present invention.

FIG. 6 is a schematic view showing a SaaS database system according to the second embodiment of the present invention. Except for a request tracker 610 and a tenant data mover 620 added in FIG. 6, the components of the database system in FIG. 6 are completely the same as those in FIG. 4, and thus the repeated explanation thereof is omitted herein.

The request tracker 610 in FIG. 6 is located in the request routing layer for tracking cross-tenant query request behavior in runtime, in particular, for tracking frequency of queries by each tenant, involving other tenants. For example, Log4JDBC in the related art can be used to implement the function of the request tracker 610. Log4JDBC is a JDBC driver capable of recording information such as SQL log and SQL execution time and so on. For example, the request tracker 610 embedded in the request routing layer can track cross-tenant query behavior by analyzing SQL statement or returned ResultSet in runtime. The tracking result of the request tracker 610 is accumulated in the request routing layer, and can be used by the request routing layer to implement routing selection.

Figure 7:
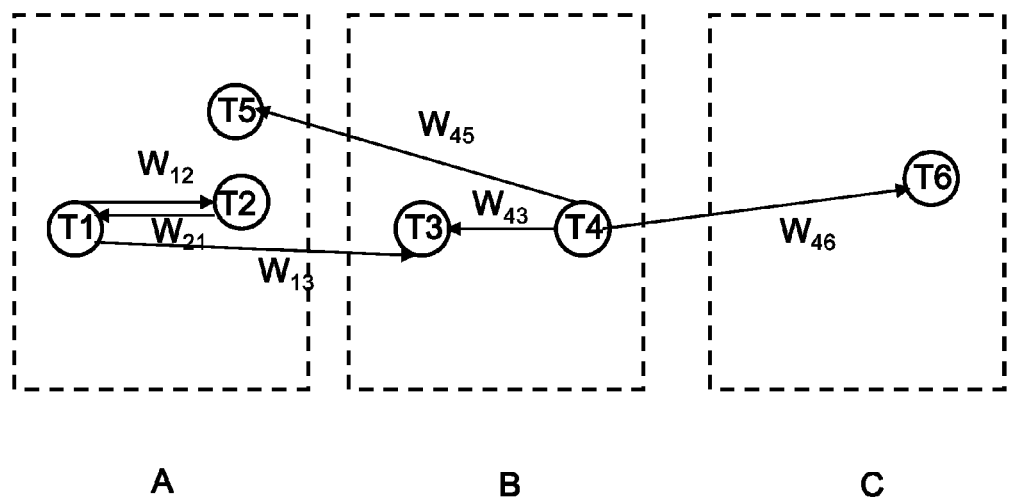
FIG. 7 is a weighted directed graph illustrating an example of tracking result obtained by the request tracker 600.

The tracking result of the request tracker 610 can be represented in a form of weighted directed graph. FIG. 7 shows an example of the tracking result obtained by the request tracker 610 in a form of weighted directed graph. In FIG. 7, a node denotes a tenant, and a directed side between nodes denotes a cross-tenant query request. For example, the directed side from T1 to T2 denotes that there exists a query request from the tenant T1 involving tenant data of the tenant T2. The weight value $w_{ij}$ on a directed side represents a frequency of cross-tenant query, where i denotes a serial number of a tenant that sends a query request, and j denotes a serial number of a tenant that is queried. For example, w43 refers to times of query request from the tenant T4 involving tenant data of the tenant T3. When wij is zero, it denotes that there is not a query request from tenant Ti involving tenant data of tenant Tj. The above weighted directed graph can be stored as a simple two-dimension array structure w[i][j]. Of course, other data structures known to those skilled in the art can be also adopted to store the weighted directed graph.

The request tracker 610 tracks cross-tenant query request and updates the weighted directed graph in runtime. Since weight values are continuously accumulated as the tracking goes on, the array w[i][j] needs to be cleared periodically. For example, it can be set by a system administrator as needed so that the array w[i][j] is cleared every hour or every day or in any necessary timing, thereby always keeping an effective tracking result of latest time period.

The tenant data mover 620 in FIG. 6 is used to move tenant data among a plurality of databases based on the tracking result of the request tracker 610. The main purpose of moving tenant data among a plurality of database is to aggregate tenant data of tenants having cross-tenant query behaviors, thereby reducing the possibility of data transmission between databases. Hereinafter, an exemplary method of moving tenant data used by the tenant data mover 620 will be provided.

It should be also noted that the tenant data mover 620 can be disposed in the request routing layer although the tenant data mover 620 illustrated in FIG. 6 is located in the database system but out of the request routing layer.

Figure 8:
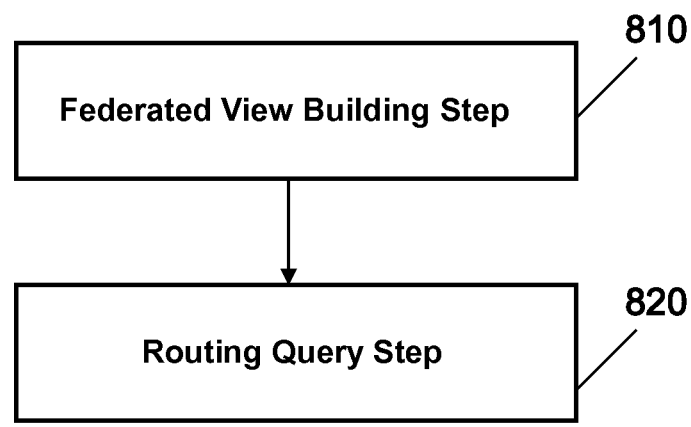
FIG. 8 is a flowchart showing a method of optimizing cross-database query according to the first embodiment of the present invention.

FIG. 8 is a flowchart showing a method of optimizing cross-database query according to the first embodiment of the present invention. The method of optimizing cross-database query is applicable to a database system including a plurality of database, at least two of the plurality of databases storing one or more data collections consisting of tables with the same structure. First, a federated view building step 810 is performed in an off-line state, that is, a federated view of the data collections is created on each of the at least two databases. A routing query step 820 is then performed in runtime to route the query request crossing the data collections to one of the at least two databases according to a predetermined routing rule by using the request routing layer in runtime, so as to query using the federated view of the database. The specific implementation of the federated view building step 810 can use, e.g., the process flow shown in FIG. 5. The routing query step 820 can use, e.g., Routing Rules 1 to 3 described as above to route the query request crossing the data collections to one of the at least two databases so as to query using the federated view of the database. The exemplary Routing Rules 1 to 3 have been described in detail in the above, thus no explanation is repeated herein.

Figure 9:
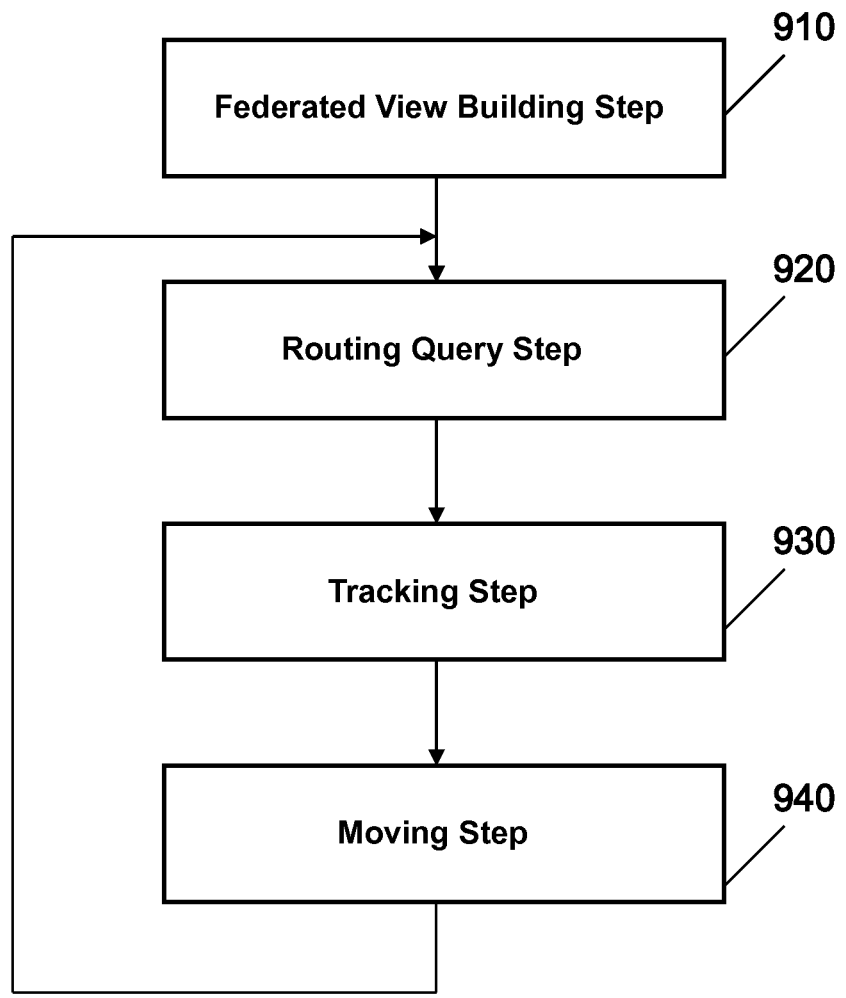
FIG. 9 is a flowchart showing a method of optimizing cross-database query according to the second embodiment of the present invention.

FIG. 9 is a flowchart showing a method of optimizing cross-database query according to the second embodiment of the present invention. The processing in FIG. 9 includes a federated view building step 910, a routing query step 920, a tracking step 930 and a moving step 940. The operations in steps 910 and 920 are the same as those in steps 810 and 820 in FIG. 8, and the description thereof is not repeated herein. After the step 920, the process in FIG. 9 proceeds to the step 930 to track cross-tenant data query request behaviors, e.g. queries and frequencies thereof of each tenant involving other tenants, in runtime by using the request tracker 610. In addition, the request tracker 610 accumulates the tracking result, e.g., in a form of weighted array w[i][j], in the request routing layer. The process in FIG. 9 proceeds to the step 940 after the step 930. In the step 940, tenant data are moved among the plurality of databases based on the tracking result of the cross-tenant data query request behavior in off-line time by using the tenant data mover 620.

Figure 10:
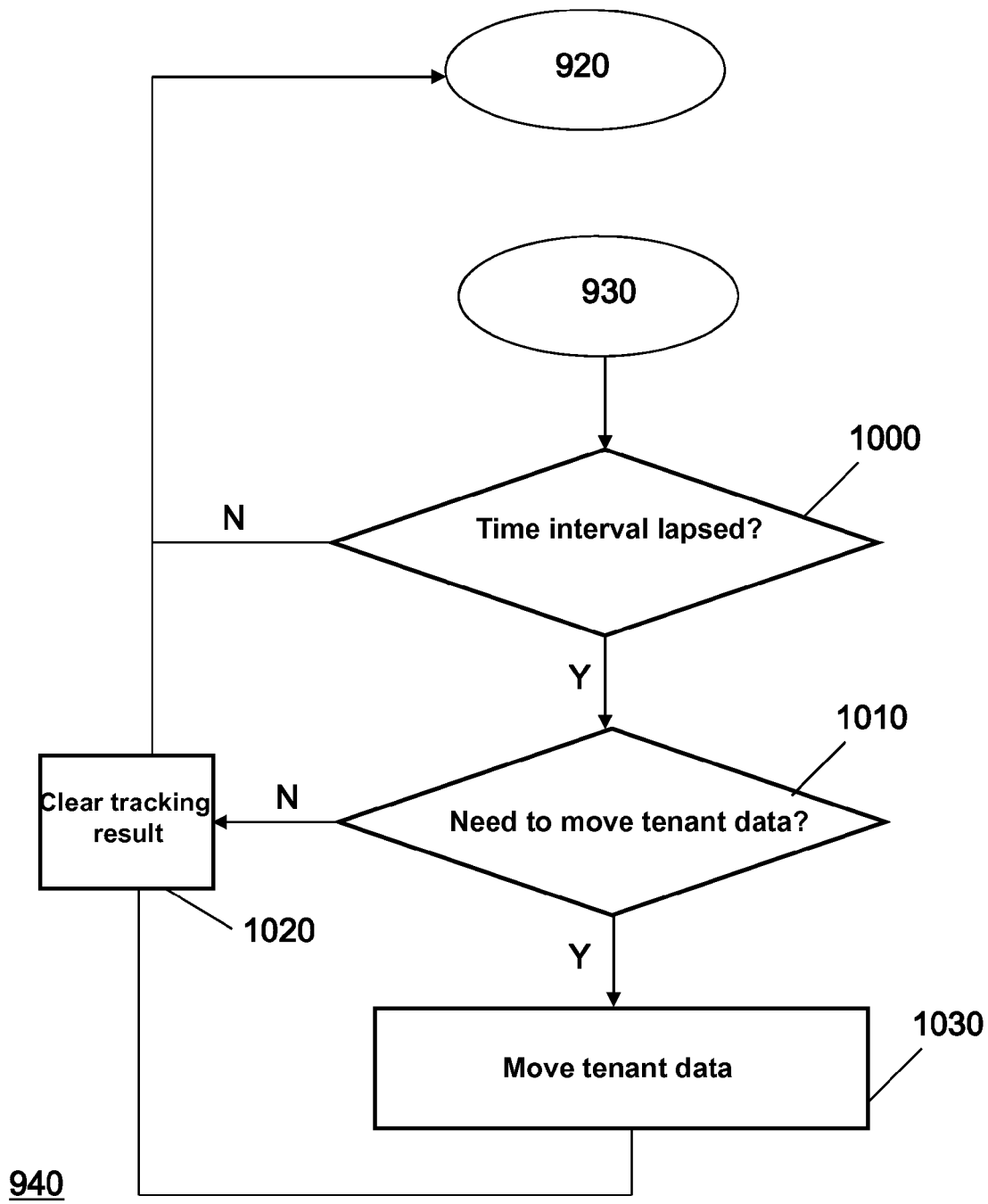
FIG. 10 is a flowchart showing an embodiment of moving step performed by tenant data mover according to the present invention.

FIG. 10 is a flowchart showing an embodiment of the moving step 940 performed by the tenant data mover 620 according to the present invention. The process in FIG. 10 begins when the tracking step 930 in FIG. 9 ends. In the step 1000, it is determined that whether a time interval T lapses since the last determination as to if tenant data needs to be moved. It should be noted that, when the step 1000 is performed at the very first time, it is determined whether a time interval T lapses since the startup of the system. The time interval T can be set by a system operator, which denotes how long the interval it takes to calculate so as to determine whether tenant data needs to be moved or not, and also denotes the period that the request tracker accumulates tracking results. The shorter the time interval T is, the higher the frequency of calculation is. For example, the time interval T can be set as one week, one day, or one hour or the like. If it is determined in the step 1000 that the time interval T has not lapsed yet, the process returns to the step 920.

On the other hand, if it is determined in the step 1000 that the time interval T lapses, the process proceeds to a step 1010. It is determined whether tenant data needs to be moved in the step 1010. If it is determined that tenant data needs not to be moved, the process proceeds to a step 1020, in which the tracking result obtained by the request tracker 610 during the time interval T is cleared. The process then returns to the step 920. If it is determined that tenant data needs to be moved, the process proceeds to a step 1030, in which the tenant data mover 620 moves the tenant data according to the determining result in the step 1010. Then, the process proceeds to the step 1020, in which the tracking result obtained by the request tracker 610 is cleared so that the request tracker can restart to accumulate the tracking result. The process then returns to the step 920.

Figure 11:
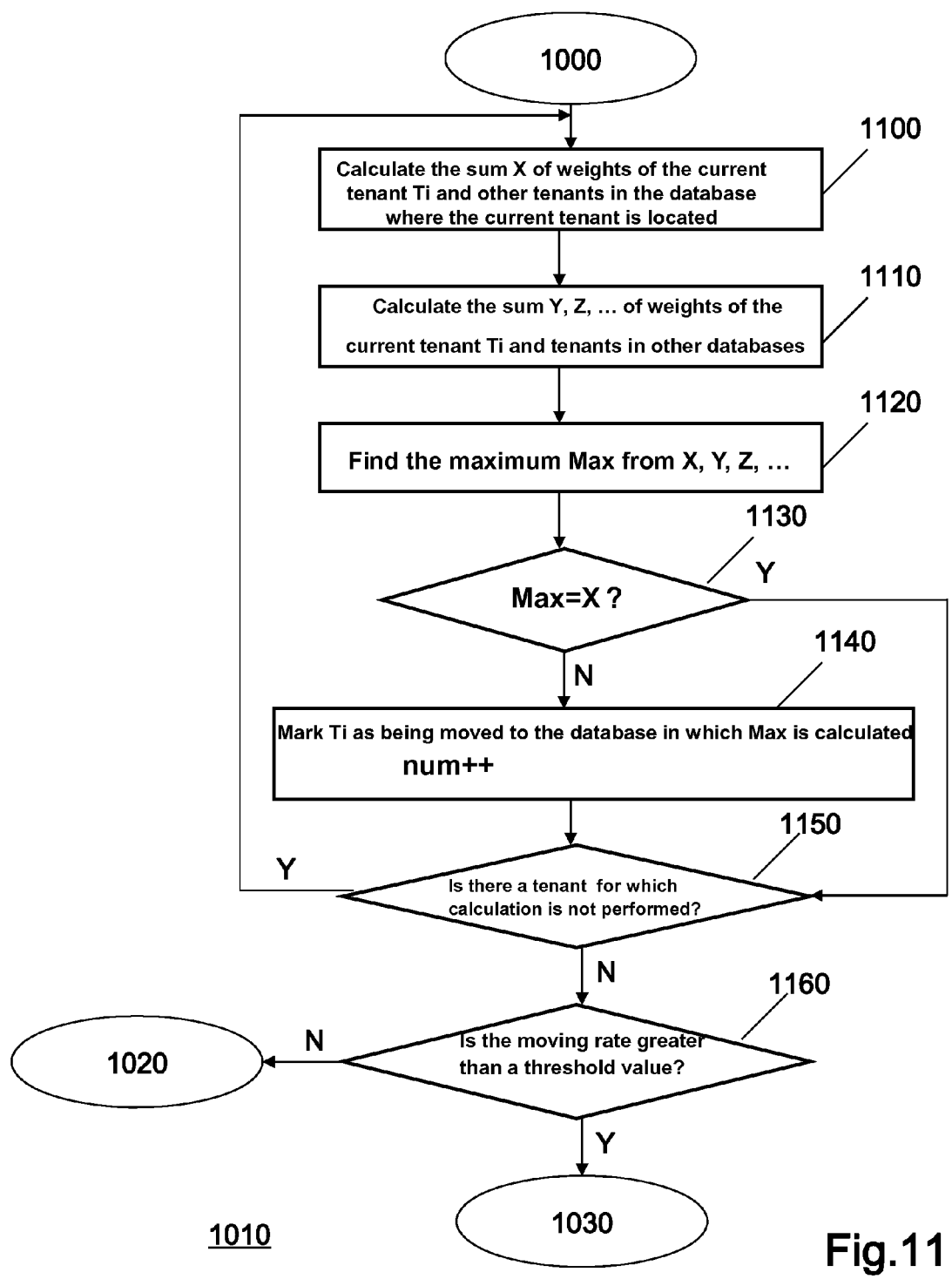
FIG. 11 is a flowchart showing an embodiment of determining processing in FIG. 10.

FIG. 11 is a flowchart showing one embodiment of determining processing in the step 1010 of FIG. 10. FIG. 11 depicts an exemplary algorithm of determining whether tenant data are to be moved and to which database the tenant data are moved. When the determining result in the step 1000 is "Yes", the process in FIG. 11 starts. Firstly, the sum (such as X) of weights of the current tenant Ti and other tenants in the database where the current tenant is located is calculated in the step 1100. When Ti is T1, taking the case in FIG. 7 as an example, the sum of weights of T1 in the database A is X=w12+w21. Then, the sums (such as Y, Z, . . . ) of weights of the current tenant Ti and the tenants in other databases are calculated in the step 1110. When Ti is T1, taking the case in FIG. 7 as an example, the sum of weights of T1 in the database B is Y=w13, and the sum of weights of T1 in the database C is Z=0. Then, in the step 1120, the maximum MAX among X, Y, Z, . . . is found. It is determined whether X is the maximum or not in the step 1130, that is, if MAX is equal to X. If X is the maximum, it is determined that Ti will not be moved, and the process proceeds to a step 1150. If X is not the maximum, in a step 1140, Ti is marked as being moved to the database in which MAX is calculated. For example, as an example of T1 in FIG. 7, if MAX=Y, T1 is marked as being moved to the database B. At the same time, the variable num for recording the number of tenant data to be moved increases by one, which was initialized to be 0 before the processing of the step 1010 is performed. After the step 1140 or when the determination in the step 1130 is "No", the process proceeds to a step 1150. In the step 1150, it is determined that whether the above processing is performed for each of the tenants. If there is a tenant for which calculation is not performed, the process returns to the step 1100, and the processing of the steps 1100 to 1140 is performed for next tenant. When the above processing is performed for all tenants, the process proceeds to the step 1160, in which a moving rate (i.e., num/the number of tenants) is compared with a threshold value (e.g. 10%). If the moving rate is greater than the threshold value, the process proceeds to the step 1030, and according to the marks marked for each tenant in the step 1140, the tenant data determined to be moved are moved to the corresponding databases. On the contrary, if the moving rate is less than the threshold value, the process proceeds to the step 1020 so as not move tenant data. The purpose of doing so is to reduce the frequency of moving tenant data, so as to avoid performing off-line operations when only a small amount of tenant data needs to be moved. The system operator can set the above threshold, which, for example, can be further set as 5%, 15%, 20% or other values.

Taking the case in FIG. 7 as an example, the threshold value is set as 20% at this time. When the calculation for T1 obtains w13>w12+w21, that is, the sum of weights of T1 in the database B is the maximum and when the calculation for T4 obtains w45>w43+w46, that is, the sum of weights of T4 in the database A is the maximum, T1 needs to be moved to the database B, and T4 needs to be moved to the database A. At this time, the moving rate=2/6=33.3%>20%, thus the moving process is performed in the step 1030 to move T1 to the database B and T4 to the database A.

It needs to be noted that the simplified example as above are given only to make the explanation on the optimizing method of the present invention to be understood easily. Those skilled in the art will understand that the concept of the present invention can be used to sufficiently determine for more complex cases.

The process in FIG. 11 is only one implementation to realize the determining in the step 1010 in FIG. 10. In addition to the sum of weights (query frequency), those skilled in the art can conceive of performing the above calculation by using the sum of data amount. For example, the above calculation can be performed by using the sum of products of the query frequency and the size of tenant data to perform determination.

Additionally, in the case of considering load balance, in the step 1010, in addition to the tracking result of the query request behavior crossing tenant data, it is determined based on the statuses of the databases. Firstly, for example, it is determined based on the statuses of the underlying databases, such as response speed and load, and when the response speed of a certain database is significantly decreased or the input and output pressure of a certain database is higher than the average value by a threshold value (e.g. 30%), tenant data in this database are determined to be moved. Secondly, for each of the tenants in this database, the sum of weights of it and other tenants in this database is calculated, and the tenant with the minimum sum of weights is determined as the tenant to be moved. Then, the sums of weights of the tenant to be moved and tenants in other databases are calculated, and the tenant data of the tenant to be moved is moved to the database with the calculated maximum value.

It will be appreciated by those skilled in the art that, the embodiments of the invention can be provided in the form of method, system or computer program product. Therefore, the invention may take the forms of pure hardware embodiment, pure software embodiment, or combined hardware and software embodiment. The typical combination of hardware and software may be a general purpose computer system with computer program. When the program is loaded and executed, the computer system is controlled to perform the above method.

The invention can be embedded in a computer program product, which includes all features that allow the method described herein to be embodied. The computer program product is included in one or more computer readable storage medium (including, but not limited to, magnetic disk storage, CD-ROM, optical storage, etc.), the computer readable storage medium has computer readable program code stored therein.

The invention has been described with reference to the flowchart and/or block diagram of method, system and computer program product according to the invention. In evidence, each block in the flowchart and/or block diagrams and the combination of blocks in the flowchart and/or block diagram can be implemented by computer program instructions. These computer program instructions can be provided to the processor of general purpose computer, dedicated computer, embedded processor or other programmable data processing apparatus to generate a machine, so that the instructions (by the processor of computer or other programmable data processing apparatus) generate a means for implementing the functions provided in one or more blocks of the flowchart and/or block diagram.

These computer program instructions can also be stored in read memories of one or more computers, each of such memories can instruct computer or other programmable data processing apparatus to put into effect in a particular manner, so that the instructions stored in computer readable memory produce a manufacture article. The manufacture article includes an instruction device that implements functions provided in one or more blocks of the flowchart and/or block diagram.

The computer program instructions can also be loaded into one or more computers or other programmable data processing apparatus such that a series of operation steps is executed on the computer or other programmable data processing apparatus, thereby a computer-implemented process is generated on each of such apparatus, resulting in that the instructions executed on the apparatus provide a method for implementing the steps provided in one or more blocks of the flowchart and/or block diagram.

While the principle of the present invention has been described in connection with the preferred embodiments of the invention above, these descriptions are only illustrative, but not to be construed as limit to the invention. Those skilled in the art could make any modification and variation to the invention without departing from the spirit and scope of the invention as defined by the appended claims.

That which is claimed is:

1. A database system comprising:
   a plurality of databases, at least two of the plurality of databases are stored with one or more data collections composed of tables with the same structure, a federated view of the data collection is created, by at least one computer processor, on each of the at least two databases; and
   a request routing layer for routing, in response to a query request crossing the data collections, the query request crossing the data collections to one of the at least two databases according to a predetermined routing rule, so as to query by using the federated view of the database;
   wherein the predetermined routing rule comprises: a first routing rule for routing a cross-tenant data query request from a tenant to the database in which tenant data of the tenant is located, a second routing rule for routing a cross-tenant data query request from a tenant to the database in which most of tenant data involved is located and a third routing rule for routing a cross-tenant data query request to the database with the lowest load based on the status of the databases.

2. The database system according to claim 1, wherein the database system is a Software-as-a-Service (SaaS) database system, and each of the data collections is a collection of data in the SaaS database system that is referred to as tenant data and belongs to one tenant.

3. The database system according to claim 2, further comprising:
   a request tracker for tracking a cross-tenant data query request behavior in runtime; and
   a tenant data mover for moving tenant data among the plurality of databases in off-line time based on the tracking result of the request tracker.

4. The database system according to claim 3, wherein the tracking a cross-tenant data query request behavior comprises tracking frequency of query by each tenant involving other tenants.

5. The database system according to claim 3, wherein the tenant data mover further moves tenant data among the plurality of databases based on the status of the databases.

6. The database system according to claim 1, wherein the status of the database comprises at least loads and response speed to query of the database.

7. The database system according to any one of claim 1, wherein the database is a distributed database.

8. The database system according to claim 1, wherein the query request crossing data collections is a SQL statement, and the SQL statement can contain a function.

9. A computer implemented method of optimizing cross-database query in a database system comprising a plurality of databases, at least two of the plurality of databases are stored with one or more data collections composed of tables with the same structure, the method comprising the steps of:
- a federated view creating step for creating a federated view of the data collections on each of the at least two databases; and
- a routing step for routing, in response to a query request crossing the data collections, the query request crossing the data collections to one of the at least two databases according to a predetermined routing rule so as to query by using the federated view of the database;
- wherein the predetermined routing rule comprises: a first routing rule for routing a cross-tenant data query request from a tenant to the database in which tenant data of the tenant is located, a second routing rule for routing a cross-tenant data query request from a tenant to the database in which most of tenant data involved is located and a third routing rule for routing a cross-tenant data query request to the database with the lowest load based on the status of the databases.

10. The computer implemented method of optimizing cross-database query according to claim 9, wherein the database system is a Software-as-a-Service (SaaS) database system, and each of the data collections is a collection of data in the SaaS database system that is referred to as tenant data and belongs to one tenant.

11. The computer implemented method of optimizing cross-database query according to claim 9, further comprising:
- tracking a cross-tenant data query request behavior in runtime; and
- moving tenant data among the plurality of databases in off-line time based on the tracking result of the cross-tenant data query request behavior.

12. The computer implemented method of optimizing cross-database query according to claim 11, further moving tenant data among the plurality of databases based on the statuses of the databases.

13. The computer implemented method of optimizing cross-database query according to claim 11, wherein the tracking a cross-tenant data query request behavior comprises tracking frequency of query by each tenant involving other tenants.

14. The computer implemented method of optimizing cross-database query according to claim 9, wherein the status of the database comprises at least loads and response speed to query of the database.

15. The computer implemented method of optimizing cross-database query according to any one of claim 9, wherein the database is a distributed database.

16. The computer implemented method of optimizing cross-database query according to claim 9, wherein the query request crossing data collections is a SQL statement, and the SQL statement can contain a function.

* * * * *